Aug. 2, 1932.    L. R. ZIFFERER    1,870,083
PIPE HANGER
Original Filed May 27, 1930
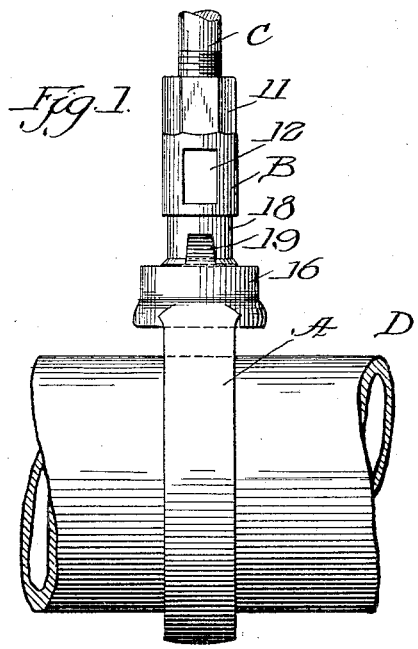
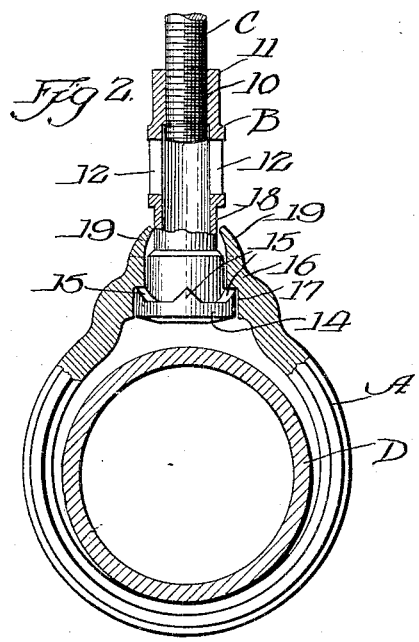
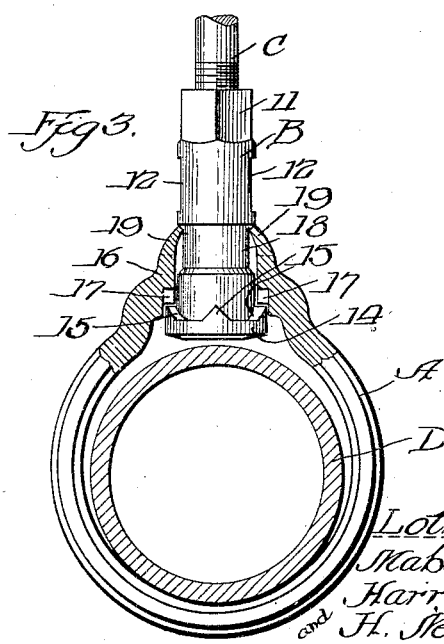
Inventor:
Lothar R. Zifferer,
Mabel C. Zifferer,
Harry E. Champion,
and H. Nelson Albright.
Executors of Estate of
Lothar R. Zifferer, Deceased.

Patented Aug. 2, 1932

1,870,083

UNITED STATES PATENT OFFICE

LOTHAR R. ZIFFERER, DECEASED, LATE OF COLUMBIA, PENNSYLVANIA, BY MABEL C. ZIFFERER AND NELSON ALBRIGHT, OF COLUMBIA, PENNSYLVANIA, AND HARRY E. CHAMPION, OF BLUE POINT, LONG ISLAND, NEW YORK, EXECUTORS, ASSIGNORS TO COLUMBIA MALLEABLE CASTINGS CORPORATION, OF COLUMBIA, PENNSYLVANIA, A CORPORATION OF NEW YORK

PIPE HANGER

Original application filed May 27, 1930, Serial No. 456,016. Divided and this application filed August 7, 1931. Serial No. 555,686.

This invention relates to a pipe hanger which is adjustable upon a depending overhead support. It comprises a ring having a swiveled mounting upon a sleeve, there being means by which these two parts may be inseparably connected.

The present invention is concerned with subject matter divided out of application Serial No. 456,016, filed May 27, 1930, by Lothar R. Zifferer, now deceased, and is directed particularly to the connection between the sleeve and ring by which these parts tend to remain in a relatively fixed rotative position, although freely rotatable after the one has been shifted longitudinally upon the other; and to the means by which such a connection is rendered inseparable, or substantially so.

A suggestive embodiment of this invention is set forth in the accompanying drawing wherein—

Figure 1 is a view in elevation of the hanger in its entirety, showing a pipe supported thereby;

Fig. 2 is a view partly in elevation and partly in longitudinal section of the hanger and supported pipe; and Fig. 3, which is a view similar to Fig. 2, shows the ring lifted to a position to permit rotation of the sleeve.

The pipe hanger herein shown comprises a ring A having a swiveled connection with a sleeve B the internal threads 10 of which co-operate with a depending bolt C having an overhead fastening. By rotating the sleeve the hanger may be adjusted vertically upon the bolt. A device of this character is adapted to support a pipe D which is receivable within the ring A, as shown.

The sleeve is provided, by preference, with a polygonal head 11 affording a convenient wrench hold. It may also have one or more transverse apertures 12 affording a view of the supporting bolt C which is threaded therewithin. At the lower end of the sleeve is a head 14 having upwardly facing teeth 15, as shown.

The ring is formed with a collar 16 on its upper side. Through this collar is formed a radial opening for the insertion of the sleeve the head of which is receivable within a seat at its inner end. Formed in this seat are teeth 17 co-operating with the teeth 15 of the sleeve head whereby to resist rotation of the sleeve relative to the ring. The hanger parts, i. e., the ring and sleeve, may conveniently be formed of metal which is cast. The sleeve is readily insertable through the collar opening for assembly with the ring. It is desired, however, that some means be provided by which to retain the sleeve in such assembled relation, and it is largely with the provision of a stop means, spaced from the head 14, that the present invention is concerned.

The sleeve portion above the head is provided with an annular groove 18 extending for a substantial longitudinal distance, and bent to lie within this groove are one or more lugs 19 which upstand from the ring collar. Initially these lugs are straight to permit free insertion of the sleeve, after which the lugs may be bent to locking position, as shown. In such a construction the sleeve is shiftable to either of the longitudinal positions shown in Figs. 2 and 3, in the former of which the teeth 15 co-act with the collar teeth 17 to resist rotation of the sleeve relative to the ring, and in the latter of which these teeth are disengaged to permit such parts to have free relative turning movement.

Due to the normal vertical position of the hanger, and also to the weight of the load supported therein, the cooperating teeth tend to remain interengaged so as to prevent rotation of the sleeve relative to the ring. The construction herein shown and described is advantageous because of its simplicity and dependability for the purpose intended, but the invention is not limited to the particular form illustrated, except as specified in the claims following.

Claims:

1. A pipe hanger in which is comprised a ring having a collar wherein is fitted a sleeve having a head with means engageable with other means on the collar for resisting rotation of the sleeve relative to the collar, a portion of the sleeve exterior beyond the collar being of reduced diameter, and the collar being provided with means bendable to lie partly within such reduced portion whereby to confine the sleeve and collar against any but a limited longitudinal movement relative to each other.

2. A pipe hanger in which is comprised a ring having a collar wherein is slidably and rotatably fitted a sleeve having a head with means engageable with other means on the collar when the collar and sleeve are in one longitudinal position relative to each other for resisting rotative movement one with respect to the other, means carried by one part bendable laterally to lie proximate to the other part, and spaced stop means arranged oppositely with respect to the laterally bent means to limit the endwise movement of the collar relative to the sleeve whereby the one part is inseparably connected to the other withal having capacity for relative longitudinal movement.

MABEL C. ZIFFERER,
HARRY E. CHAMPION,
H. NELSON ALBRIGHT.
*Executors of the Estate of Lothar R. Zifferer, Deceased.*